United States Patent

Kreuer et al.

[11] Patent Number: 5,453,250
[45] Date of Patent: Sep. 26, 1995

[54] APPARATUS FOR THE PREPARATION OF A FLOWABLE REACTION MIXTURE

[75] Inventors: Karl-Dieter Kreuer; Klaus Schulte, both of Leverkusen, Germany

[73] Assignee: Bayer Aktiengesellschaft, Leverkusen, Germany

[21] Appl. No.: 122,269

[22] Filed: Sep. 16, 1993

Related U.S. Application Data

[63] Continuation-in-part of Ser. No. 90,386, Jul. 12, 1993, abandoned.

[30] Foreign Application Priority Data

Jul. 16, 1992 [DE] Germany .................. 42 23 437.9

[51] Int. Cl.$^6$ ................... C08F 2/00; B01F 7/00
[52] U.S. Cl. ............... 422/133; 422/131; 422/132; 422/135; 422/224; 422/225; 366/272; 366/280
[58] Field of Search .................. 422/131–138, 422/224, 225; 366/103, 272, 280

[56] References Cited

U.S. PATENT DOCUMENTS

| | | | |
|---|---|---|---|
| 2,979,237 | 4/1961 | Snow et al. | 222/413 |
| 3,394,925 | 7/1968 | Sluijters | 259/25 |
| 3,617,029 | 11/1971 | Breer et al. | 422/133 |
| 4,264,214 | 4/1981 | Scholl et al. | 366/103 |
| 4,399,104 | 8/1983 | Coblenz et al. | 422/111 |
| 4,452,917 | 6/1984 | Proksa et al. | 521/50 |

FOREIGN PATENT DOCUMENTS

| | | |
|---|---|---|
| 460397 | 5/1974 | Australia . |
| 351852 | 1/1990 | European Pat. Off. . |
| 752524 | 7/1956 | United Kingdom . |
| 820265 | 9/1959 | United Kingdom . |
| 904757 | 8/1962 | United Kingdom . |

OTHER PUBLICATIONS

"Kunststoff Handbuch" (Plastic manual), vol. 7, Polyurethane, published by Carl Hanser Verlag, Munich, Vienna (1983), p. 103.

Primary Examiner—Robert J. Warden
Assistant Examiner—Christopher Y. Kim
Attorney, Agent, or Firm—Joseph C. Gil

[57] ABSTRACT

Leakage problems can be avoided in an apparatus for the preparation of a solid or cellular plastic-forming, flowable reaction mixture of at least two flowable reaction components and at least one additional component, by providing in the feed pipe of one of the reaction components a mechanical pre-mixer having a stirrer shaft. Upstream of the pre-mixer, a hydraulic motor comprising two meshing toothed wheels which is driven by the components themselves, is disposed in a manner such that one of the toothed wheels is disposed on an extension of the stirrer shaft, and wherein the bearings of the toothed wheels and the stirrer shaft are outwardly enclosed.

1 Claim, 2 Drawing Sheets

APPARATUS FOR THE PREPARATION OF A FLOWABLE REACTION MIXTURE

This application is a continuation-in-part of U.S. application Ser. No. 08/090,386, filed Jul. 12, 1993, now abandoned.

BACKGROUND OF THE INVENTION

The present invention relates to an apparatus for the preparation of a solid or cellular plastic-forming, flowable reaction mixture from at least two flowable reaction components and at least one additional component. The apparatus broadly comprises supply vessels from which feed pipes for the reaction components lead via dosing pumps to a mix head, and a feed pipe for the additional component, which opens upstream of or into a pre-mixer having a stirrer shaft and being disposed in one of the feed pipes.

One device for mixing three components is described in U.S. Pat. No. 3,617,029.

Such apparatuses are utilized particularly in processing polyurethane systems, in order to add additional components to one or both principal components—generally a polyol and an isocyanate. Such additional components include activators, flameproofing agents, dye-pastes, low boiling point blowing agents and the like, such as are described in the "Kunststoff Handbuch" (Plastics manual), Vol. 7, Polyurethane, published by Carl Hanser Verlag, Munich, Vienna (1983), page 103. Other additives include explosive blowing agents, such as pentane, and fibrous and powdered additives. Such additives are added on conventional equipment via pre-mixers in the low-pressure region. A disadvantage of this is that unpleasant leakages can occur at the shaft sealings. Intermediate vessels are also frequently disposed downstream of the pre-mixers for interim storage of the mixture prior to processing. If the additional component is a blowing agent, this may volatilize into the gas space in the interim vessel. To avoid these disadvantages, it is advantageous to add the blowing agent on the high-pressure side. This is fundamentally known. Mix quality is, however, deficient when dosing is by means of static mixers. It is not, however, possible to utilize a high-performance mechanical stirrer on the high-pressure side, because there is no way of avoiding the necessity for a drive shaft lead through, because of the increased risk of leakage.

The object of the present invention was consequently to design the pre-mixer in an apparatus of the type noted in such a manner that it works without leakage and ensures the desired degree of mixing.

DESCRIPTION OF THE INVENTION

Figure 1:
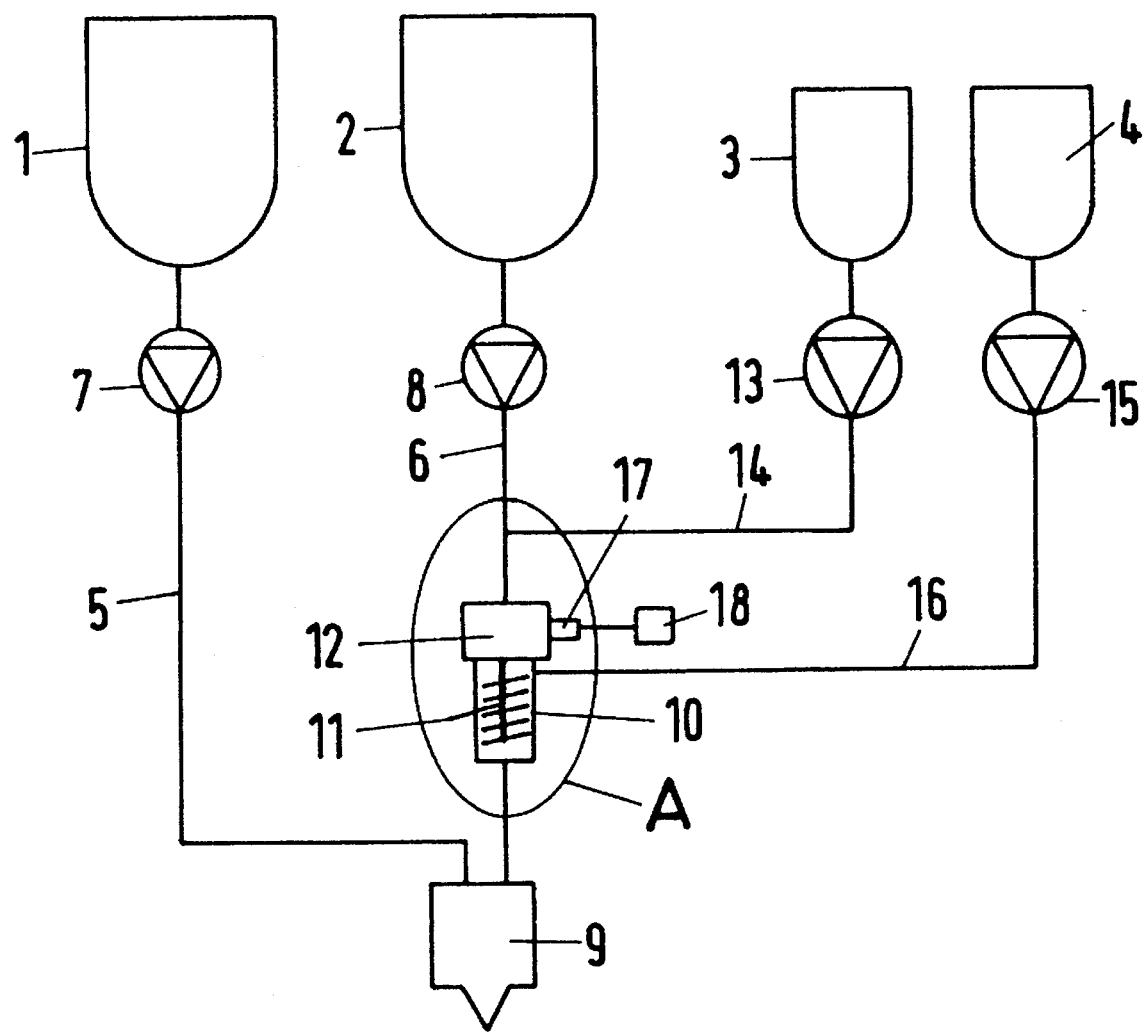
FIG. 1 is a schematic view of the apparatus of the present invention.

The above noted object is achieved by arranging upstream of the pre-mixer two toothed wheels meshing with one another working as a hydraulic motor, wherein the stirrer shaft of the pre-mixer exhibits an extension on which one of the two toothed wheels is disposed, wherein the outlet of the hydraulic motor opens into the pre-mixer and wherein the bearings of the toothed wheels and of the stirrer shaft are enclosed outwardly.

The toothed wheels working as a hydraulic motor obviate the need for an external drive with shaft lead through. It is surprising that the reaction component itself and—depending on whether input is upstream or downstream of the hydraulic motor, the additional component too—can drive the pre-mixer and in so doing also still effect their adequate mixing. Admittedly, a greater pressure drop occurs as a result of the novel arrangement, but this is of no consequence. The pressure loss which occurs when the hydraulic motor is driven has virtually no effect, particularly when operating at a high-pressure of several hundred bars. The pre-mixer can be utilized to a particular advantage on the high-pressure side. Obviously, it also brings advantages in terms of avoidance of leakages when utilized on the low-pressure side. The approaching stream of the principal component, to which either the additional component is already admixed upstream of the toothed wheels acting as the hydraulic motor, or which is only introduced downstream of them into the pre-mixer, drives the toothed wheels, the liquid being transported in the tooth spaces and being introduced directly into the pre-mixer on the outlet side. If the additives are non-abrasive materials, these will be fed into the main component feed pipe upstream of the hydraulic motor, because then pre-mixing already takes place. Abrasive additives are advantageously input only in the pre-mixer because of wear, which is unavoidable. Stirrer shafts which are suitable are those which are equipped with spines, blades, paddles and the like. It is also possible for such spines, blades and paddles to be additionally disposed in a stationary manner on the internal wall of the pre-mixer.

A starter coupled with a revolution counter is preferably allocated to the toothed wheels. This enables the actual rate of revolution, and hence, taking account of the volume conveyed per revolution, the actual volume conveyed, to be determined. If required, the rates of revolution of the dosing pumps for the main component and the additional component can be controlled via a control device, as a function of the effective rate of revolution measured.

Reference will now be made to the drawings. The apparatus works with high-pressure dosing at 200 bar and generally includes a supply vessel 1 for isocyanate, a supply vessel 2 for polyol, a supply vessel 3 for a blowing agent and a supply vessel 4 for an abrasive substance. In this case, polyol and isocyanate are the principal or reaction components, and the blowing agent and the abrasive substance are additional components. Feed pipes 5, 6, which contain high-pressure dosing pumps 7, 8, lead from the supply vessels, 1, 2 to a high-pressure mix head 9. A pre-mixer 10 having a mechanical stirrer shaft 11 is disposed in the feed pipe 6, specifically between the high-pressure dosing pump 8 and the high-pressure mix head 9. A hydraulic motor 12 is disposed upstream of the pre-mixer 10. Upstream of the hydraulic motor, a feed pipe 14 containing a high-pressure dosing pump 13 leading from the supply vessel 3 opens into the feed pipe 6. A second feed pipe 16, also containing a high-pressure dosing pump 15, leads from the supply vessel 4 and opens into the pre-mixer 10 upstream of the stirring region of the stirrer shaft 11. A starter 17 is associated with the hydraulic motor 12 and is connected to a revolution counting device 18.

Figure 3:
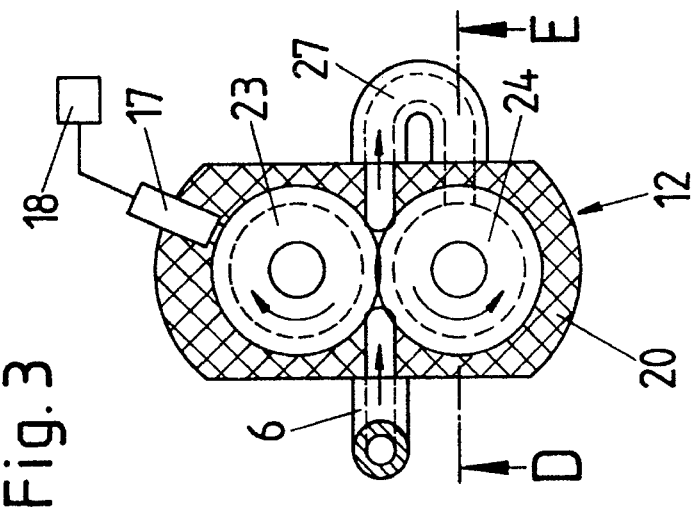
FIG. 3 is a sectional view through the line B–C of FIG. 2.
Figure 2:
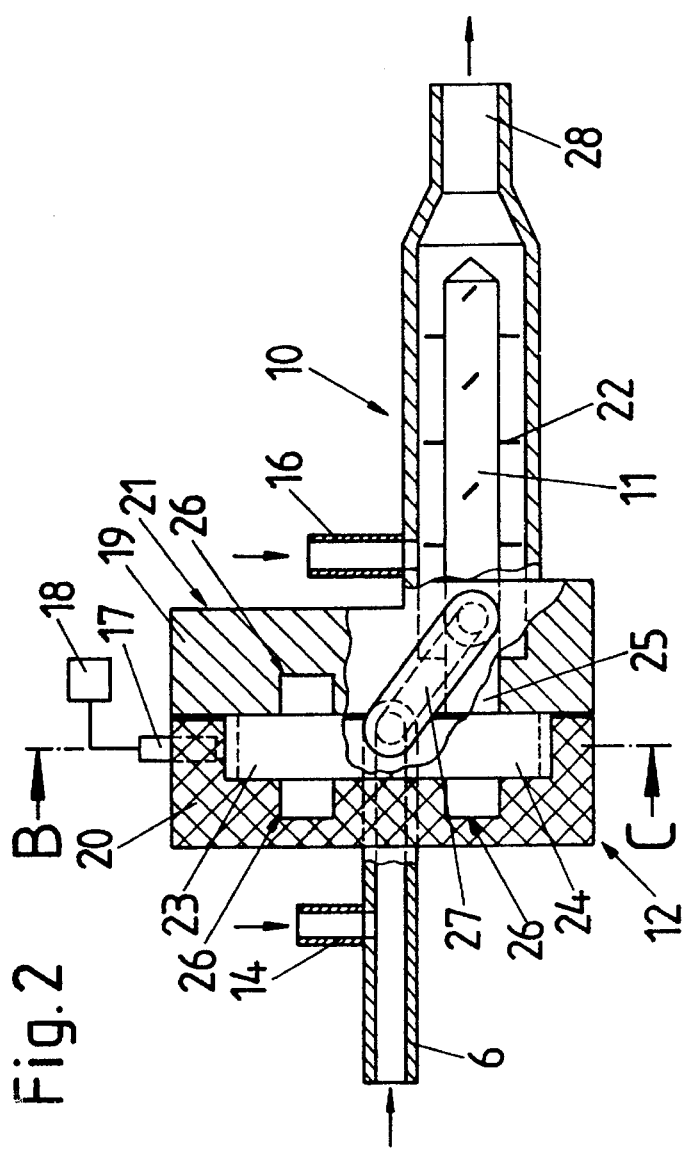
FIG. 2 is a sectional view through an enlarged representation of detail A of FIG. 1.
Figure 4:
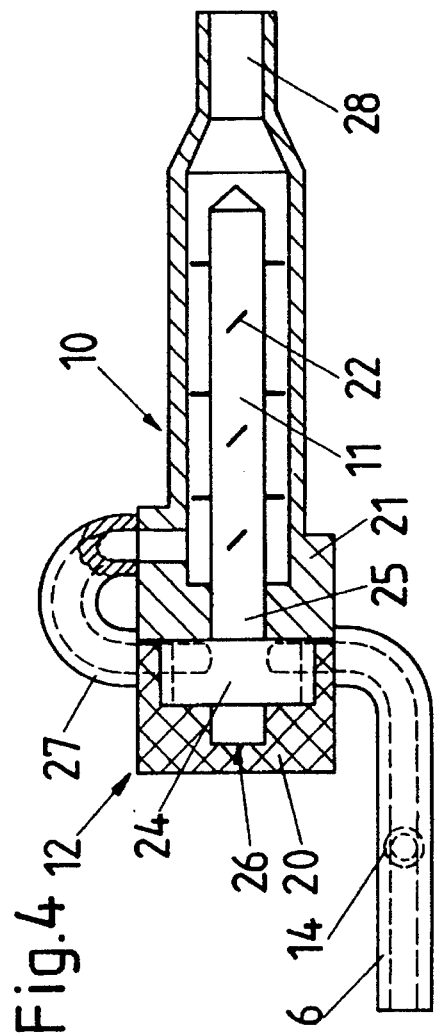
FIG. 4 is a sectional view through the line D–E of FIG. 3.

In FIGS. 2, 3 and 4, the pre-mixer 10 and the hydraulic motor 12 share a common housing 21 comprising two housing parts 19, 20 which are screwed together in a sealed manner. The stirrer shaft 11 equipped with stirring spines 22 and two toothed wheels 23, 24 which form the hydraulic motor 12 and mesh together, are disposed therein. The toothed wheel 24 is seated on the extension 25 of the stirrer shaft 11. All the shaft bearings 26 are completely enclosed outwardly. The feed pipe 14 opens into the feed pipe 6. The feed pipe 6 opens on one side between the two toothed wheels 23, 24 and leads away opposite on the other side as outflow 27, which opens into the pre-mixer 10. The feed pipe 16 opens directly into the pre-mixer 10. From the outflow 28 of the pre-mixer the feed pipe 6 then further leads to the mixing head 9.

It would also be possible to provide for an intermediate vessel and optionally a further dosing pump, in particular a high-pressure dosing pump, between pre-mixer 10 and mixing head 9. If this were the case, the dosing pumps 8, 13 and 15 could be constructed as low-pressure pumps, so that the pre-mixer 10 works in the low-pressure region.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In an apparatus for the preparation of a flowable reaction mixture of at least two flowable reaction components and at least one additional component, comprising supply vessels from which feed pipes for the reaction components lead via dosing pumps to a mix head, and a feed pipe for the additional component which opens either upstream of a pre-mixer, or into a premixer, said pre-mixer having a stirrer shaft, said stirrer shaft having bearings associated therewith, with said pre-mixer being disposed in one of the feed pipes for one of the reaction components, the improvement comprising i) two toothed wheels which mesh with one another and work as a hydraulic motor disposed upstream of said pre-mixer, said toothed wheels having bearings associated therewith, and said hydraulic motor having an input and an outlet,
   ii) said stirrer shaft having an extension on which one of the two toothed wheels is disposed, said stirrer shaft being caused to rotate by rotation of said one of two toothed wheels,
   iii) the outlet of said hydraulic motor opening into said pre-mixer, and
   iv) the bearings of the toothed wheels and of said stirrer shaft being enclosed outwardly.

* * * * *